United States Patent [19]

Hindman

[11] Patent Number: 4,475,573

[45] Date of Patent: Oct. 9, 1984

[54] HOT AND COLD MIXING VALVE FOR FEEDING A SHOWER HEAD, BATH TUB OR THE LIKE

[75] Inventor: Clarence B. Hindman, Morgantown, W. Va.

[73] Assignee: Sterling Faucet Co., Schaumburg, Ill.

[21] Appl. No.: 493,076

[22] Filed: May 9, 1983

[51] Int. Cl.³ .................... F16K 11/07; F16K 11/06; F16K 11/02
[52] U.S. Cl. .................................................. 137/625.41
[58] Field of Search ............ 137/625.4, 625.41, 625.42

[56] References Cited

U.S. PATENT DOCUMENTS

| | | | |
|---|---|---|---|
| 796,252 | 8/1905 | Tollinger | 137/625.41 X |
| 1,313,105 | 8/1919 | Moran | 137/625.41 |
| 1,427,606 | 8/1922 | Leahy | 137/625.41 X |
| 1,527,927 | 2/1925 | Schröder | 137/625.41 X |
| 2,528,272 | 10/1950 | Gilman | 137/625.41 X |
| 2,911,008 | 11/1959 | Du Bois | 137/625.41 X |
| 3,023,784 | 3/1962 | Monson | 137/625.41 X |
| 3,171,441 | 3/1965 | Schönfeld | 137/625.41 X |
| 3,410,487 | 11/1968 | Hyde | 137/625.41 X |
| 3,625,255 | 12/1971 | Genin | 137/625.4 X |
| 3,674,048 | 7/1972 | Manoogian et al. | 137/625.41 X |
| 3,726,318 | 4/1973 | Hyde | 137/625.41 |
| 3,830,257 | 8/1974 | Metivier | 137/625.41 |
| 3,916,951 | 11/1975 | Schmitt | 137/625.41 X |
| 3,921,659 | 11/1975 | Radewick | 137/625.41 X |
| 3,987,819 | 10/1976 | Scheuermann | 137/625.41 X |
| 4,089,347 | 5/1978 | Christo | 137/625.41 X |

Primary Examiner—Martin P. Schwadron
Assistant Examiner—John S. Starsiak, Jr.
Attorney, Agent, or Firm—Leydig, Voit, Osann, Mayer & Holt, Ltd.

[57] ABSTRACT

A hot and cold mixing valve for connection to hot and cold water lines for feeding a shower head, bath tub or the like. Control is effected by upper and lower valve discs coupled to a stem and spaced axially from one another to provide a mixing space between them. An upper inlet opening terminates at the face of the upper disc while a lower inlet opening terminates at the face of the lower disc, the openings being in substantial alignment with one another. Each of the discs has an arcuate through-opening of tapering width so as to define a wide head and narrow tail subtending an arc of preferably 315°. An outlet port is formed in the valve body in communication with a mixing space between the discs. The through-openings are oriented head opposite tail in complementary overlapping relation so that dead sectors on the discs are simultaneously alignable with the inlet openings to define the off position. Movement from the off position exposes one of the inlet openings to maximum degree on the other to minimum degree, with rotation of the stem gradually reversing the proportion of exposed width and hence the ratio of hot to cold water which flows through the outlet port.

5 Claims, 18 Drawing Figures

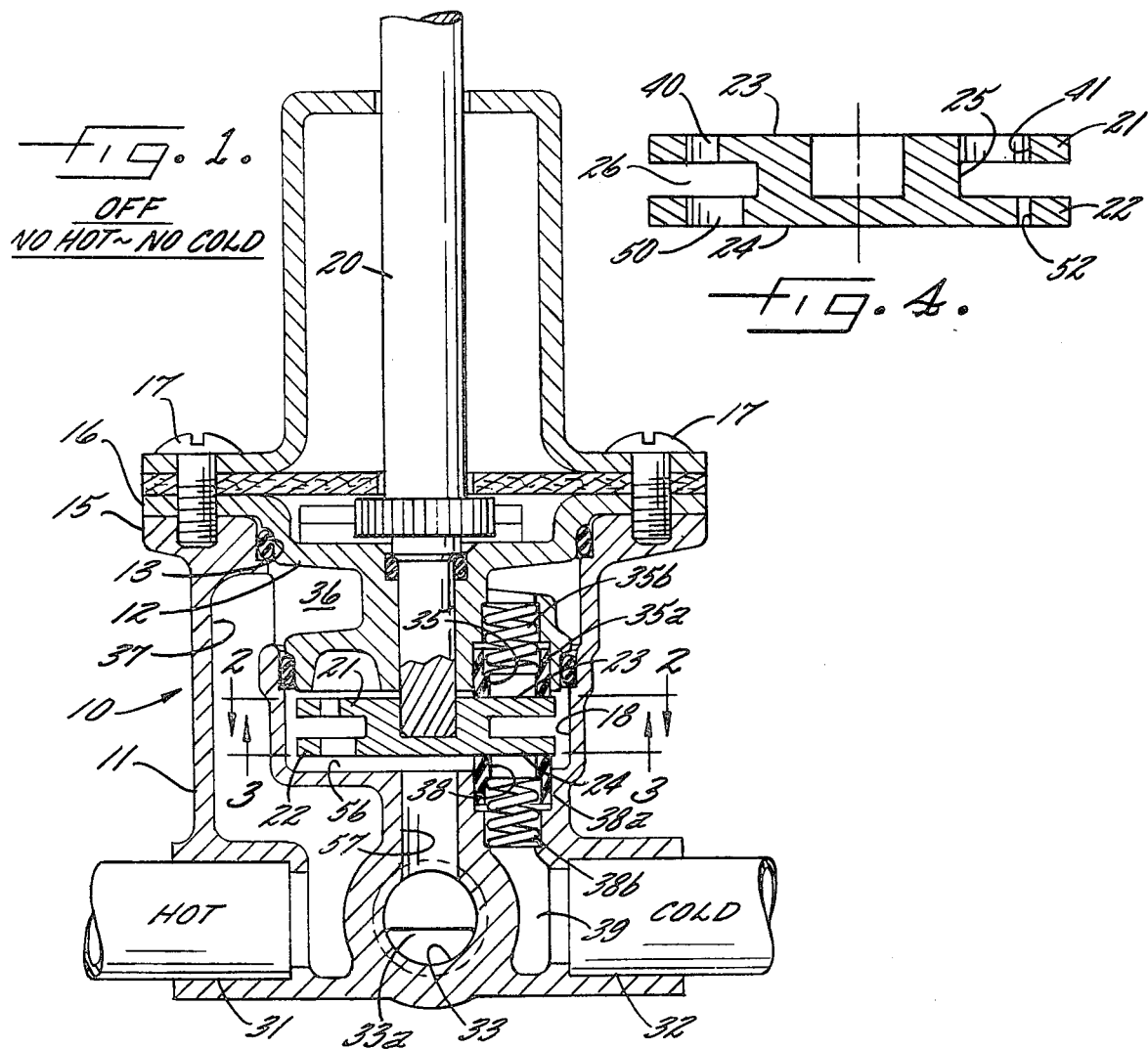
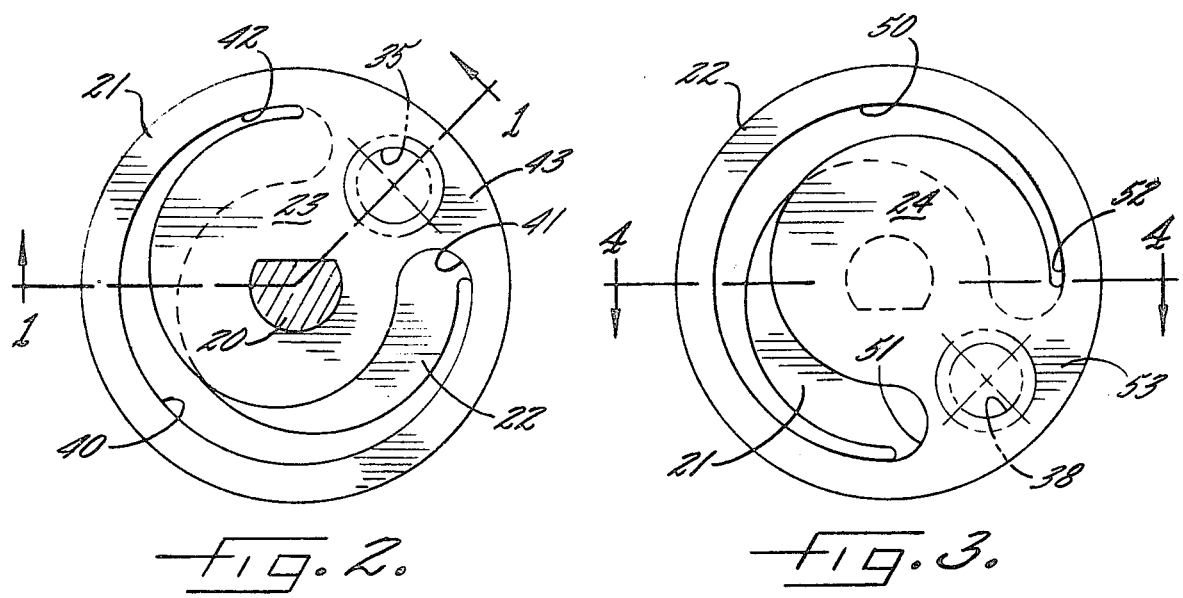

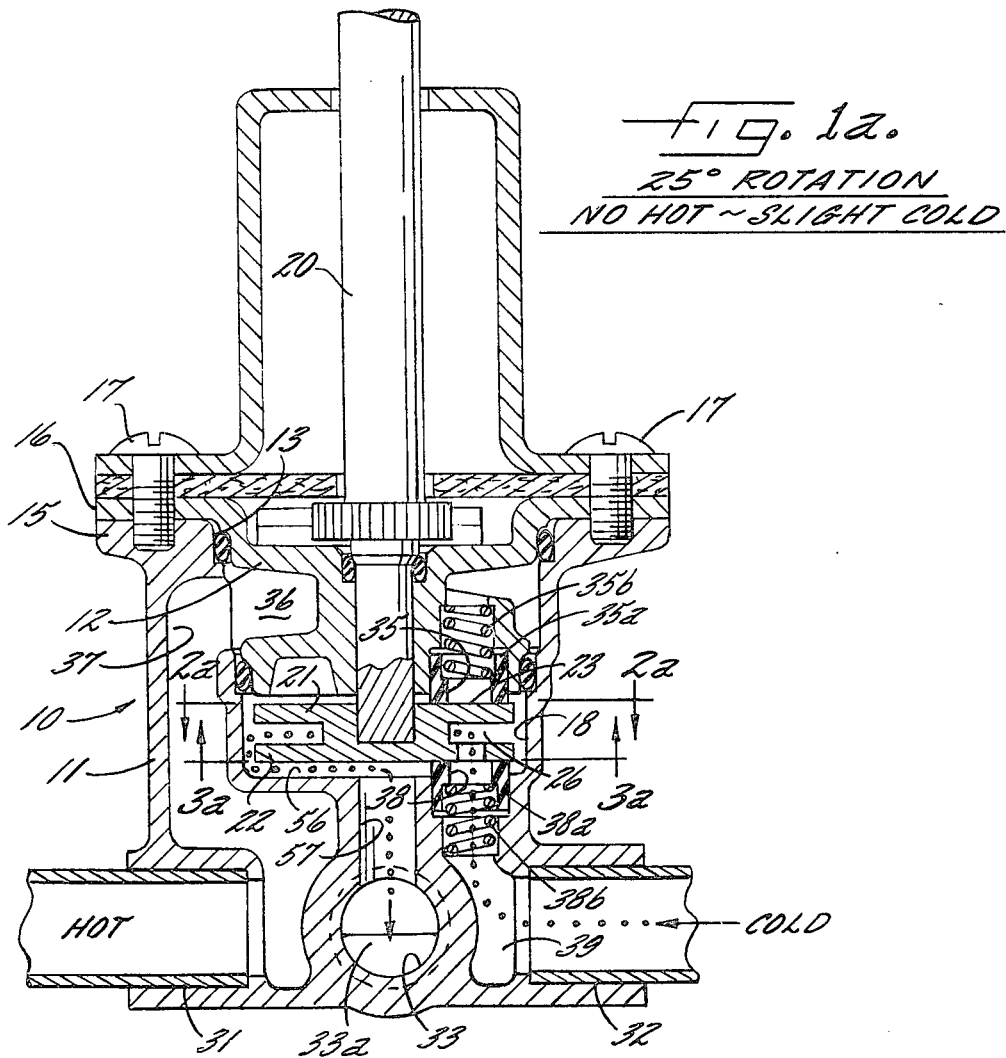

45° ROTATION
SLIGHT HOT ~ FULL COLD

180° ROTATION
HALF HOT ~ HALF COLD

315° ROTATION
FULL HOT ~ SLIGHT COLD

HOT AND COLD MIXING VALVE FOR FEEDING A SHOWER HEAD, BATH TUB OR THE LIKE

It is common practice to provide a mixing valve for feeding water to a shower head and/or bath tub which includes a single control for varying the proportion of hot and cold inlet water, thereby to control the temperature of the discharged water. However, conventional mixing valves are so constructed that the control arc is inherently limited so that the entire range from "full cold" to "full hot" occurs within but a limited arc of movement of the control handle. This results in a control which is highly position-sensitive so that the user is often subjected to the discomfort of cold water and the hazard of overly hot water before finding the "just right" position.

The difficulty of finding the proper adjustment is increased by the fact that the control is not smooth but may, on the contrary, be jerky, or sticky, particuarly after months or years of usage, because of the drag of a moveable control element against a stationary surface, particularly under conditions of high water pressure and where there is an accumulation of lime.

It is, accordingly, an object of the present invention to provide a mixing valve which is easy and convenient to operate, which has a wide range of swing between the cold and hot conditions and which may be more precisely adjusted for safety and comfort. It is a related object to provide a mixing valve for a shower head, bath tub or the like which has a wider range of temperature control than existing designs allow and in which the control requires application of only light fingertip pressure and occurs smoothly in spite of the fact that the valve may have been in service for a long period of time in a high pressure system and where the water supply has a high lime content.

It is, more specifically, an object to provide a mixing valve which uses separate discs for the control of the hot and cold water, with a mixing space between them, and in which the hot and cold inlet openings are in axially opposed relation so that the control discs need not be urged against adjacent stationary surfaces under the biasing force of a high pressure water supply.

It is a general object of the invention to provide a mixing valve which has a substantially larger arc of control movement typically 270° or more, than is achieved in conventional mixer valves, which may be operated with extremely light control pressures but which is nevertheless inherently leak-proof and which is of simple and economical construction, salable at a cost which is substantially less than conventional mixing valves not having the improved features.

Other objects and advantages of the invention will become apparent upon reading the attached detailed description and upon reference to the drawings in which:

FIG. 4 is an enlarged cross-section of the companion discs taken along the line 4 in FIG. 3;

FIGS. 1a, 2a, and 3a respectively correspond to FIGS. 1, 2 and 3 showing the valve "cracked" for initial discharge of cold water.

Figure 1B:
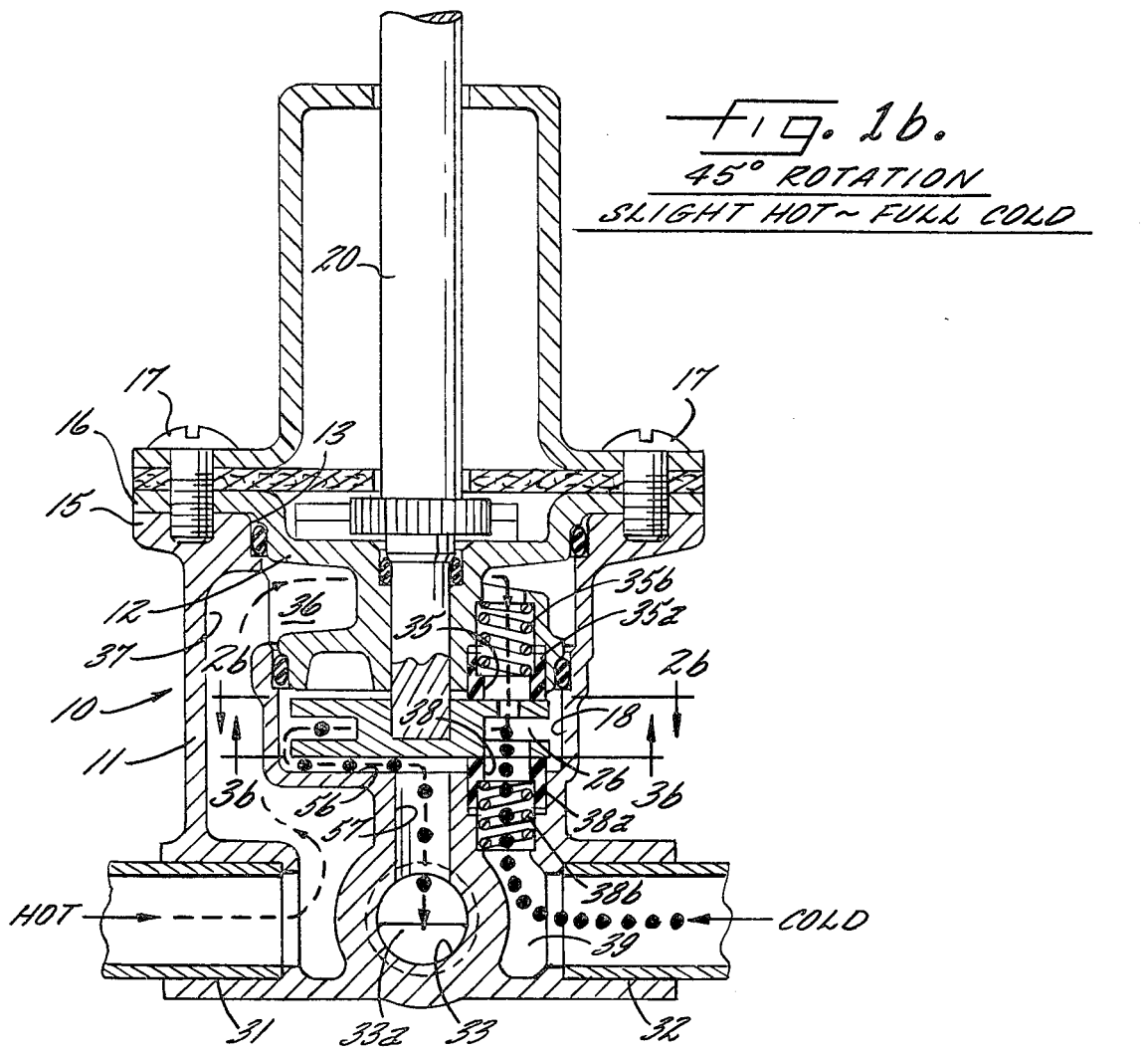
FIG. 1 shows an axial section of the improved mixing valve as viewed along line 1—1 in FIG. 2.
Figure 2B:
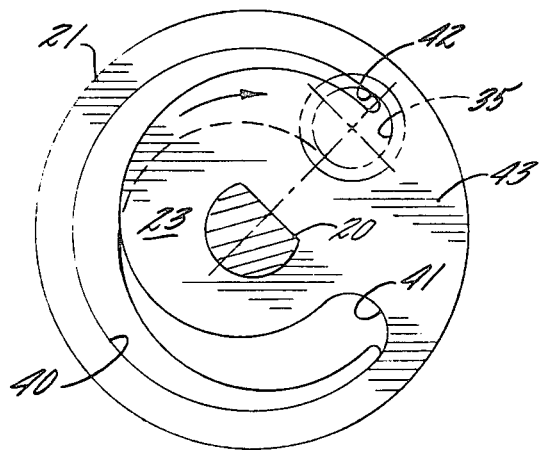
FIG. 2 shows the profile of the upper control disc in FIG. 1 as viewed along line 2—2 in the latter figure.
Figure 3B:
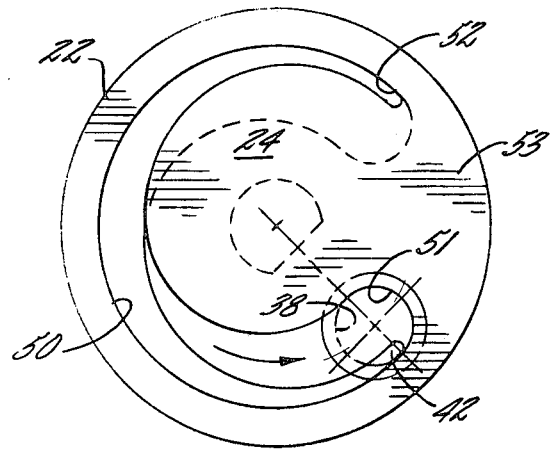
FIG. 3 shows the profile of the lower control disc as viewed along line 3—3 in FIG. 1.

FIGS. 1b, 2b and 3b show the maximum discharge of cold water mixed with a slight flow of hot.

Figure 1C:
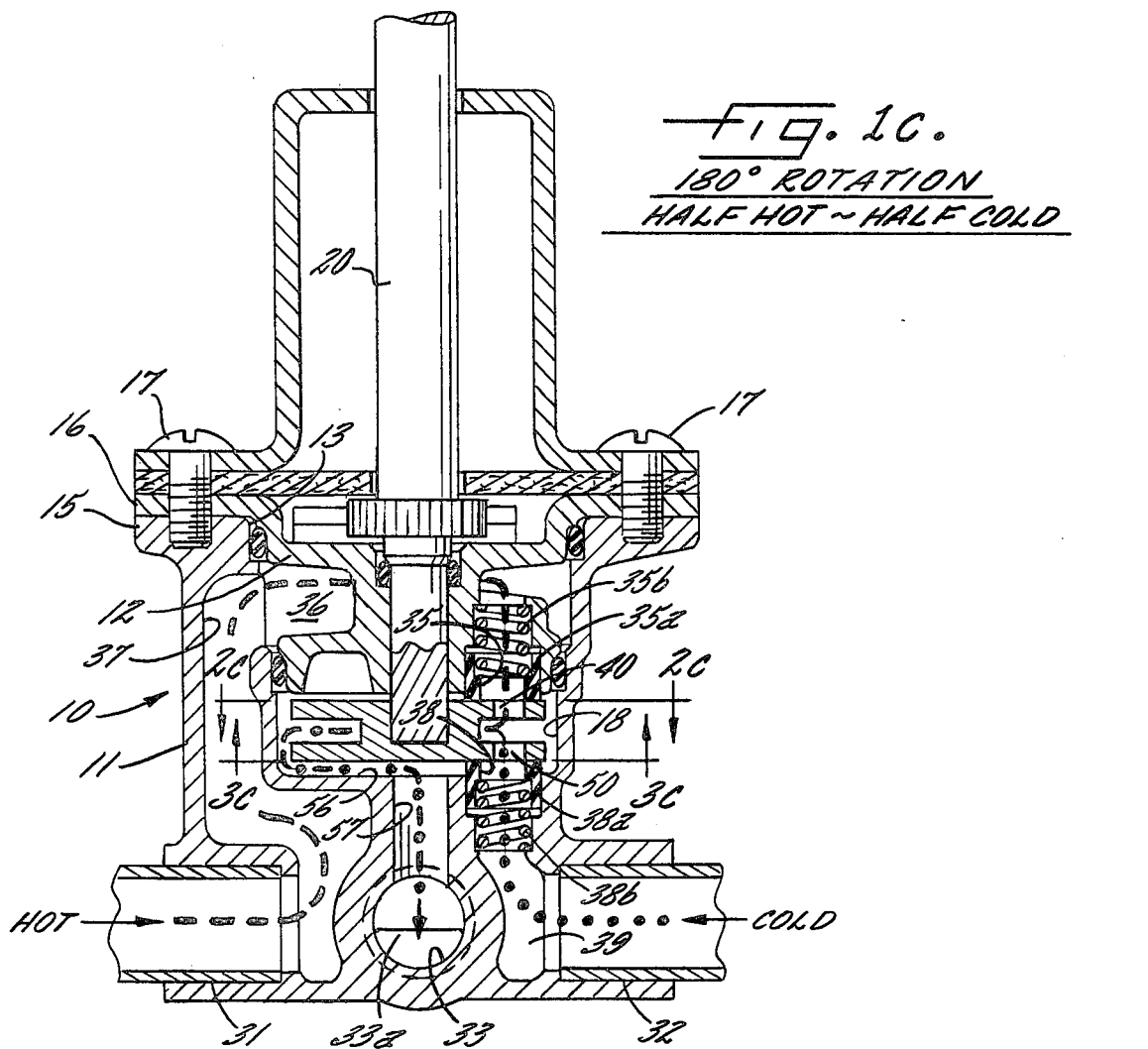
Figure 2C:
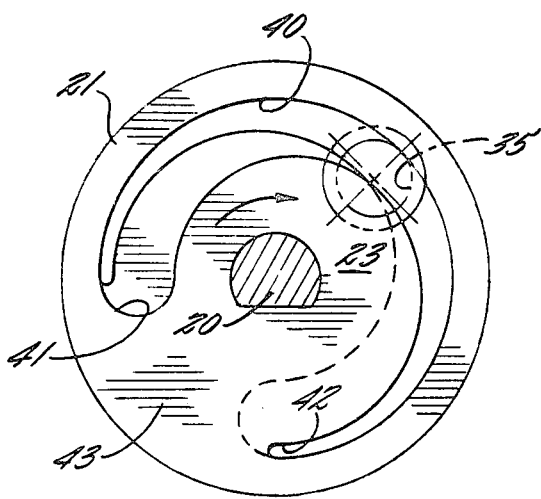
Figure 3C:
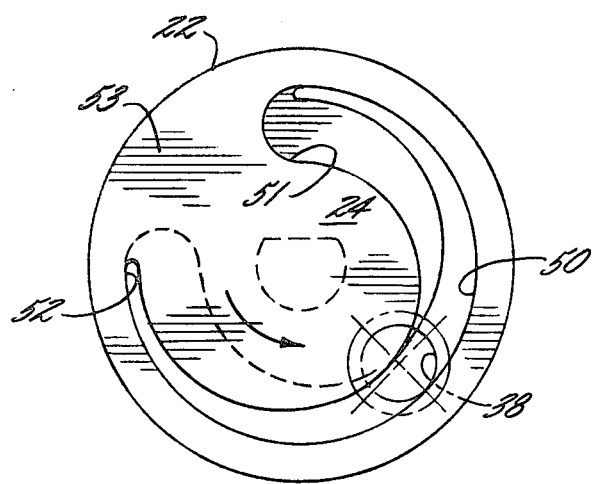

FIGS. 1c, 2c and 3c show the mid condition of the control stroke in which the proportion of hot to cold water is substantially even.

Figure 1D:
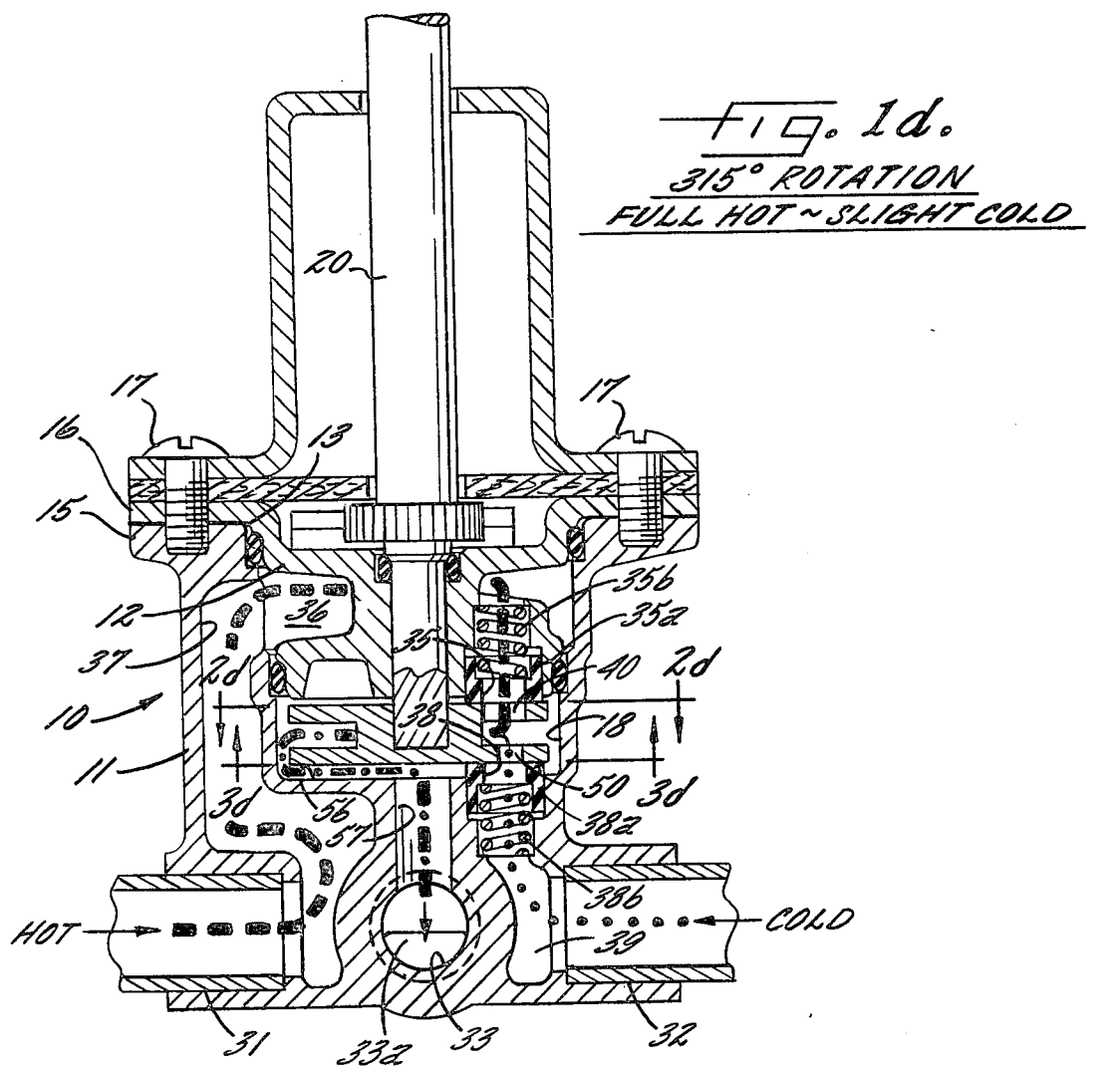
Figure 2D:
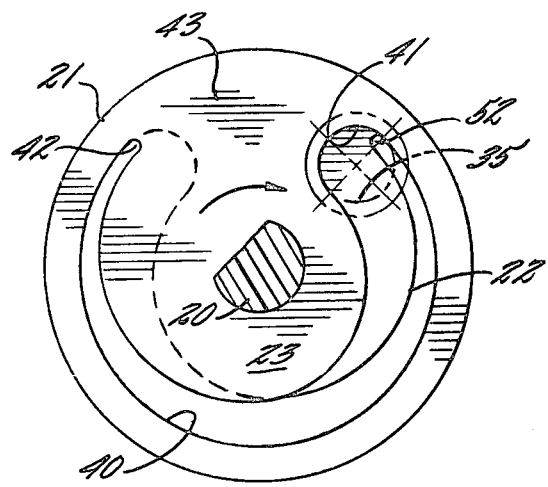
Figure 3D:
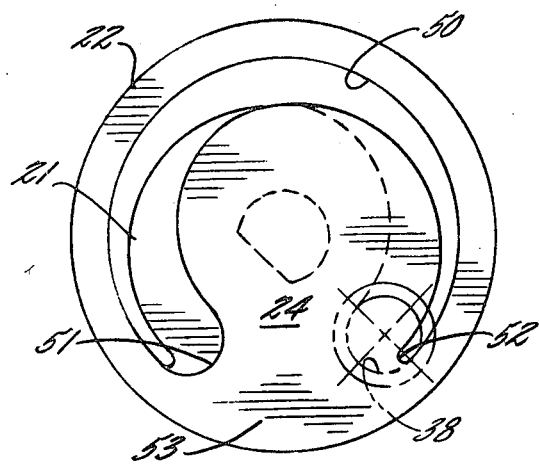

FIGS. 1d, 2d and 3d show the condition at the end of the control stroke in which the flow consists, substantially entirely, of hot water.

Figure 5:
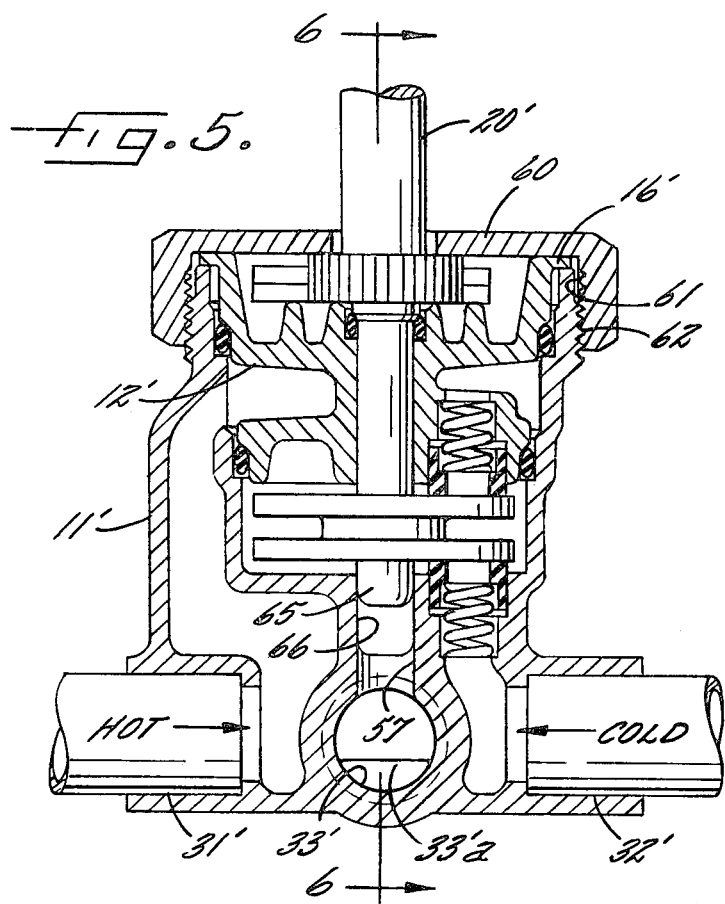
Figure 6:
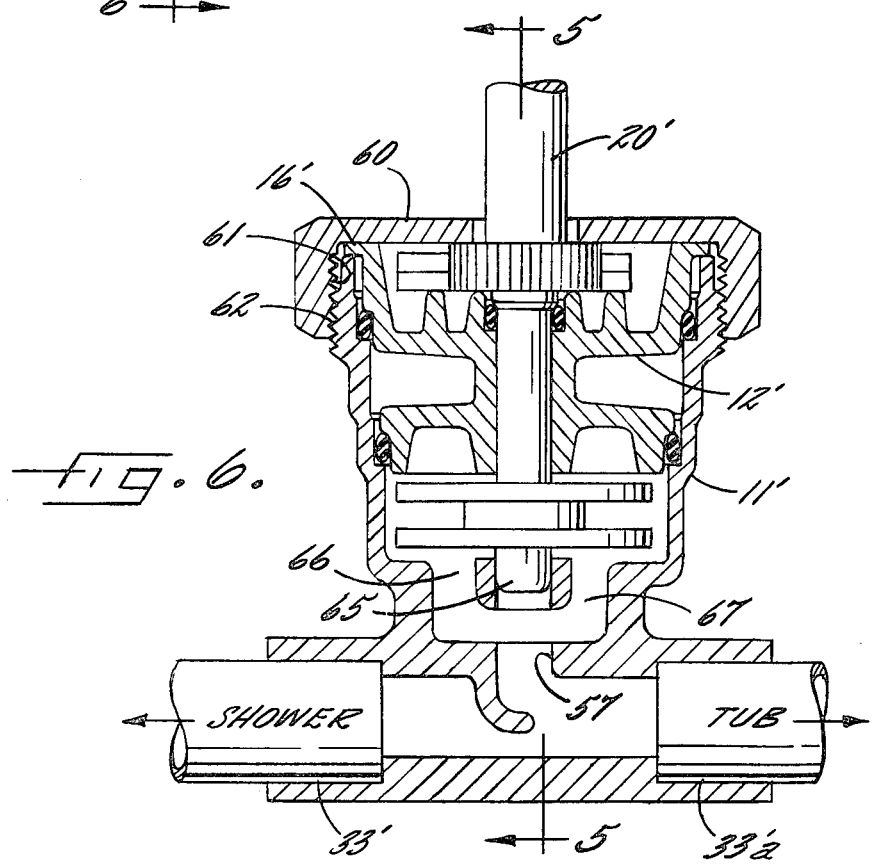

FIG. 5 is an axial section taken through a modified form of the invention employing a screw type retaining cap, as viewed along section line 5—5 in FIG. 6;

FIG. 6 is an axial section looking line 6—6 in FIG. 5.

While the invention has been described in connection with certain preferred embodiments it will be understood that I do not intend to be limited to the particular embodiments shown but intend, on the contrary, to cover the alternative and equivalent forms of the invention included within the spirit and scope of the appended claims.

Turning now to FIGS. 1-4 there is shown, in revealing section, a mixing valve of a new construction. The device characteristically has a hollow valve body 10 made up of a lower portion 11 which is hollow cup shape and an upper portion 12 in the form of an insert fitted into the open end of the cup and sealed to the inner wall 13 of the cup. The two portions of the body have mating flanges 15, 16 held together by screws 17. The cup and insert, together, define an annular chamber 18.

Extending into the chamber and axially journalled in the insert 12 is a stem 20 which will be understood to have a handle or pointer (not shown) at its upper end and which is coupled, at its lower end, to a pair of flow control discs including an upper disc 21 and lower disc 22. The discs have upwardly and downwardly presented faces 23, 24 respectively. The discs are integral with one another, being connected by a central neck 25, surrounding which is an annular mixing chamber 26 between the discs.

The lower portion of the valve body provides four pipe connections which lead to the chamber 18 which contains the discs. These include a hot water pipe connection 31, a cold water pipe connection 32 and outlet connections 33, 33a. Coupled to the hot water pipe connection 31 is an upper inlet opening 35 which terminates at the upwardly presented face 23 of the upper disc 21. To provide communication for the upper inlet opening, the insert 12 is centrally necked down to provide an annular passage 36 so that the insert is of hour glass shape. The annular passage 36 communicates with the hot water pipe connection 31 via an axially extending passageway 37 which is formed along the inner wall of the lower portion 11 of the valve body. Similarly there is a lower inlet opening 38 which terminates at the downwardly presented face 24 of the disc 22 and which is connected, via a passageway 39, to the cold water pipe connection 32. In carrying out the present invention, the inlet openings 35, 38 are aligned with one another in the axial direction for a reason which will become clear as the discussion proceeds.

Further, in accordance with the invention the inlet openings 35, 38 are provided with hollow cylindrical bushings of resilient material which are snugly and slidably telescoped into the upper and lower inlet openings and biased against the respective discs by coil springs. Thus I provide bushings 35a, 38a which are biased downwardly and upwardly, respectively, by small coil springs 35a, 35b. The bushings may be made of durable, yet resilient plastic material having rubber-like characteristics. It is preferred to use teflon, nylon, polyethylene or equivalent having a durometer rating on the shore "A" scale of 70 to 95. The presented surfaces 23, 24 of the discs are preferably smoothly finished and both the nose and wall surface of the individual bushings are smoothly finished to provide a joint which is substantially leakproof in spite of the use of light biasing springs exerting an endwise force, in working position, on the order of 2 ounces.

In accordance with the present invention each of the discs has an arcuate through-opening of tapering width so as to define a wide head and a narrow tail subtending a control arc of at least 180°, and which may be as great as 270°–315° or more, defining a "dead" sector between the tail and the head. The through-openings in the two discs are oriented head-opposite-tail in complementary overlapping relation so that the dead sectors are simultaneously alignable with the inlet openings 35, 38 to define an off position of the valve and so that movement of the stem from the off position exposes one of the inlet openings at its maximum width and the other inlet opening at its minimum width, with progressive rotation of the stem gradually reversing the proportion of exposed width and hence the ratio of hot to cold water flowing through the discs.

Turning attention first to the upper disc, which is shown in face view in FIG. 2, it includes an arcuately shaped through-opening 40 having a relatively wide head 41 tapering down to an extremely thin tail 42. As shown the through-opening 40 occupies an arc of more than 270° to provide a dead sector 43 capable of sealing the inlet opening 35 in the off position of the disc. Similarly there is provided, in the disc 22 (see FIG. 3), an annular through-opening 50 having a relatively wide head portion 51, tapering body, and extremely thin tail portion 52, there being defined, between the tail and the head, a dead sector 53 effective to close off the inlet opening 38.

Thus, when the valve is actively operating, water flows from the inlet openings 35, 38 through the openings in the respective discs into the mixing chamber 26 between the discs, the through-openings being sufficiently restricted to give a throttling action. Clearance is provided at the edge of the lower disc and under the lower disc, as indicated at 56 for escape of the water through the pipe connection 33, such escape occurring via an axially extending outlet port 57 which extends downwardly from the lower disc.

Four positions of the control disc are illustrated in the "a", "b", "c" and "d" views. Thus referring to FIGS. 1a, 2a and 3a, cracking the valve open from its off position causes a slight flow of cold water from the lower inlet 38. As shown in FIG. 2a under this "cracked" condition the upper, or hot, inlet 35 remains turned off. This manner flow of cold water signifies to the user that control is starting at the "cold" end and that it is therefore safe to turn the handle further.

Turning the handle to the "b" condition provides a full flow of cold water through the opening 38 and, as indicated in FIG. 2b, a minor flow of hot water occurs through the inlet 35. Unless the user is interested in taking a cold shower, this condition signifies that it is safe to advance the handle still further.

Rotary movement of the discs is continued, with the water gradually getting warmer, until equal quantities of hot and cold water are flowing as illustrated in FIGS. 2c and 3c. As the stem is rotated still further the rate of flow of hot water is further increased while the rate of flow of the cold water is simultaneously decreased, gradually reversing the proportion of hot to cold water until a comfortable temperature is achieved, whereupon the control is left at that setting.

The limit condition is illustrated in FIGS. 2d and 3d in which the hot water is flowing at the maximum rate with substantially no flow of cold water. While it has not been shown in the drawings it will be apparent to one skilled in the art that a limit stop may be placed in the path of rotary movement of the stem 20 which operates the discs to prevent the stem from being turned all the way to the "full hot" condition which might present a hazard if the mixing valve is connected to a hot source which operates at a high and possibly dangerous temperature.

When the bath is completed the stem is simply rotated in the reverse direction thereby reversing the temperature sequence which has been described until the mixing valve is in the completely shut off condition illustrated in the first three figures.

As stated the total arc of control between the off condition and the full hot condition, which may in a practical case range up to 270° or even 315° is to be contrasted with conventional mixing valves in which the entire range of temperature is encountered within a relatively small arc. The wide swing of the control not only enables a much greater range of temperature to be achieved, but the particular operating point within the range may be set with a high degree of precision thereby insuring both comfort and safety.

It is also to be noted that in more conventional mixing valves employing a control disc the control disc is biased with substantial force against a stationary surface. Because of the force which is exerted, particularly when using water from a high pressure source, and because of the frictional effect at the engaged surfaces, which may be due in part to a collection of lime or other minerals, or by reason of corrosion, substantial force is necessary to turn the handle and the operation tends to be sticking or jerky resulting in sudden wide changes in temperature which can be dangerous as well as uncomfortable. The present control, in contrast, is not effected by the high pressure of the water supply since the line pressure is applied to the two discs in alinement simultaneously and in opposite directions, thereby cancelling itself out. Thus the only force to be overcome, in addition to the friction of the stem itself, is that which is due to the engagement of the resilient bushings 35a, 38a against the faces of the discs under the light biasing force of the coil springs 35b, 38b. This results in an operating force, or torque, which is only a small fraction of that normally required in mixing valves of conventional design. Moreover as the discs are rotated back and forth during the life of the device, a bright clean path is constantly renewed by the resilient surface on the bushings thereby constantly cleaning the discs from collections of deposited lime or the like along the relative path of movement of the bushings. This self cleaning action also enhances the integrity of the seal between the bushing and disc insuring against leakage in the off position of the control.

While the use of cooperating flanges 15, 16 on the lower and upper portions 11, 12 of the valve body, held together by a set of screws 17, achieves adequate sealing, it is also contemplated that a threaded retaining cap may be employed in lieu of the flanges and screws. Such a retaining tap, illustrated at 60 in FIG. 5 has an internal thread 61 which engages an external thread 62 formed on the lower portion of the valve body. The cap 60 presses down upon a small flange 16' at the upper edge of the insert 12' thereby holding the insert in bottomed sealing engagement with the top edge of the cooperating valve body portion 11'.

The structure illustrated in FIG. 5 differs from that shown in FIG. 1 in another respect, namely, that the lower disc is provided with a stub shaft or pilot, 65 which is fitted into the normal outlet port 57'. Since the water can no longer flow downward directly along the disc axis, auxiliary escape ports 66, 67, leading to the outlet pipe connection 33' are provided as illustrated in FIG. 6.

The device, notwithstanding the advantageous features which have been discussed, is of inherent simplicity with all of the component parts being simply formed at low cost and simply assembled. The device may be expected to operate without care or maintenance for long periods of time because of its inherent self cleaning action, but when maintenance is required the device may be easily disassembled, either by removing the screws 17 in the first embodiment or the unscrewing the cap 60 in the second.

It will be understood that the directions such as "up" and "down" used herein are relative and that the device will, normally, be employed with the stem in horizontal position. It will also be understood that while the inlet openings 35, 38 are preferably in precise axial alignment they may be displaced slightly from one another without substantially affecting the operation of the valve. Finally, while the device has been described in connection with its use in controlling the flow of tempered water to a shower head or bath tub, the device is not limited to such usage and may be employed wherever variably proportioned flow of two liquids to an outlet is desired.

What is claimed is:

1. A hot and cold water mixing valve for connection to hot and cold water lines for feeding a shower head, bath tub or the like comprising a hollow valve body having a stem rotatable therein from an off position, upper and lower valve discs spaced axially from one another to provide a mixing space between them and coupled to the stem for rotation in unison, means defining an upper inlet opening in the valve body terminating at the upwardly presented face of the upper disc, means defining a lower inlet opening in the valve body terminating at the downwardly presented face of the lower disc, the inlet openings being in substantial alignment with one another in the axial direction, each of the discs having an arcuate through-opening of tapering width so as to define a wide head and a narrow tail subtending a control arc of at least 180° and with a dead sector between the tail and head, means defining an outlet port in the valve body in communication with the mixing space between the discs, the through-openings in the two discs being oriented head-opposite-tail in complementary overlapping relation so that the dead sectors are simultaneously alignable with the inlet openings to define the off position for the valve and so that movement of the stem from the off position exposes one of the inlet openings at its maximum width and the other inlet opening at its minimum width with progressive rotation of the stem gradually reversing the proportion of exposed width and hence the ratio of hot to cold water which flows through the outlet port thereby gradually changing the water temperature while maintaining the total flow substantially constant.

2. The combination as claimed in claim 1 in which hollow cylindrical bushings of resilient material are snugly yet slidably telescoped into the upper and lower inlet openings, said bushings having associated coil springs for pressing them respectively against the presented faces of the disc.

3. The combination as claimed in claim 1 in which the stem extends axially upwardly from the discs and in which the outlet port extends axially downwardly in the valve body, clearance being provided at the edge of and on the underside of the lower disc to accommodate flow of water between the mixing space and the outlet port.

4. The combination as claimed in claim 1 in which the valve body includes a cup-shaped lower portion and an upper portion in the form of an insert fitted into the open end of the cup for enclosing and sealing the same to define a central annular space occupied by the discs, the stem being journalled axially in the insert, the upper and lower inlet openings being formed in the respective upper and lower portions of the body.

5. The combination as claimed in claim 4 in which the insert is of hourglass shape in axial section defining with the inner wall of the lower portion an annular passage which is in communication with the upper inlet opening, the lower portion of the valve body having an axially extending passageway extending along its inner wall and having communication at its upper end with the annular passage so that pipe connections with the hot and cold water lines may both be made to the lower portion of the valve body.

* * * * *